United States Patent
Dluhy

[15] 3,675,795
[45] July 11, 1972

[54] SHIPPING CONTAINER WITH RACKS FOR SUPPORTING VEHICLES THEREIN

[72] Inventor: Herbert Dluhy, Scotch Plains, N.J.

[73] Assignee: American Export Isbrandtsen Lines, Inc., Hoboken, N.J.

[22] Filed: April 27, 1970

[21] Appl. No.: 32,158

[52] U.S. Cl. .................................. 214/16.1 CC, 296/1 A
[51] Int. Cl. ........................................................ E04h 6/06
[58] Field of Search ................. 214/16.14 C; 105/368 R; 296/1 A; 108/131–133

[56] References Cited

UNITED STATES PATENTS

| | | | |
|---|---|---|---|
| 1,280,512 | 10/1918 | Macomber | 105/368 R |
| 1,778,124 | 10/1930 | Sauer | 108/132 |
| 1,818,957 | 8/1931 | Adams | 214/16.14 C |
| 2,127,965 | 8/1938 | Strid et al. | 105/368 R |
| 2,127,966 | 8/1938 | Strid et al. | 105/368 R |
| 2,213,501 | 9/1940 | Mussey | 105/368 R |
| 2,485,178 | 10/1949 | Weinkauf | 108/132 |
| 2,668,089 | 2/1954 | Cowan | 108/132 |
| 2,672,387 | 3/1954 | Barricks | 108/133 |
| 2,820,560 | 1/1958 | Davis | 214/38.8 |

Primary Examiner—Gerald M. Forlenza
Assistant Examiner—R. B. Johnson
Attorney—Kenyon & Kenyon Reilly Carr & Chapin

[57] ABSTRACT

A vehicle support rack, preferably for use in conjunction with a fully closable shipping container, which acts to support a vehicle in a confined space during shipment. The rack includes a pair of connected tracks, each of which has a support leg on one end thereof to enable the rack and vehicle to be maintained in an inclined position. Each leg is locked in position by a resiliently biased catch in engagement therewith, the catch being operable by a release cord disposed at one end of the rack. Once the vehicle is positioned on the rack, the rearward portion thereof is raised and locked into place by the support legs. Rollers are provided, both on the bottom and sides of the rack, to facilitate placement of the rack within the container, with such placement allowing a greater number of vehicles to be placed within the container.

7 Claims, 7 Drawing Figures

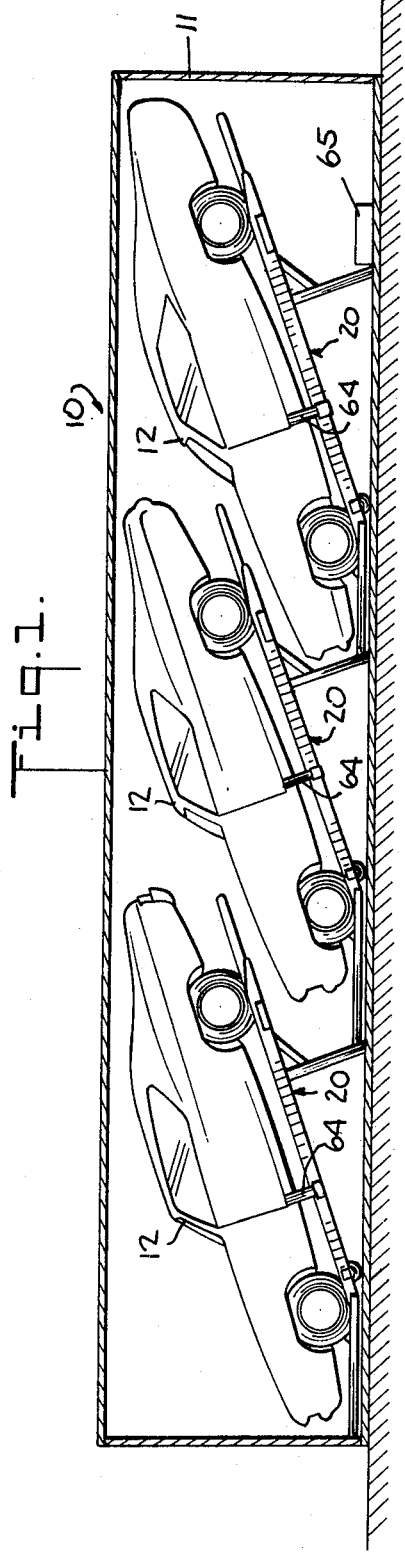
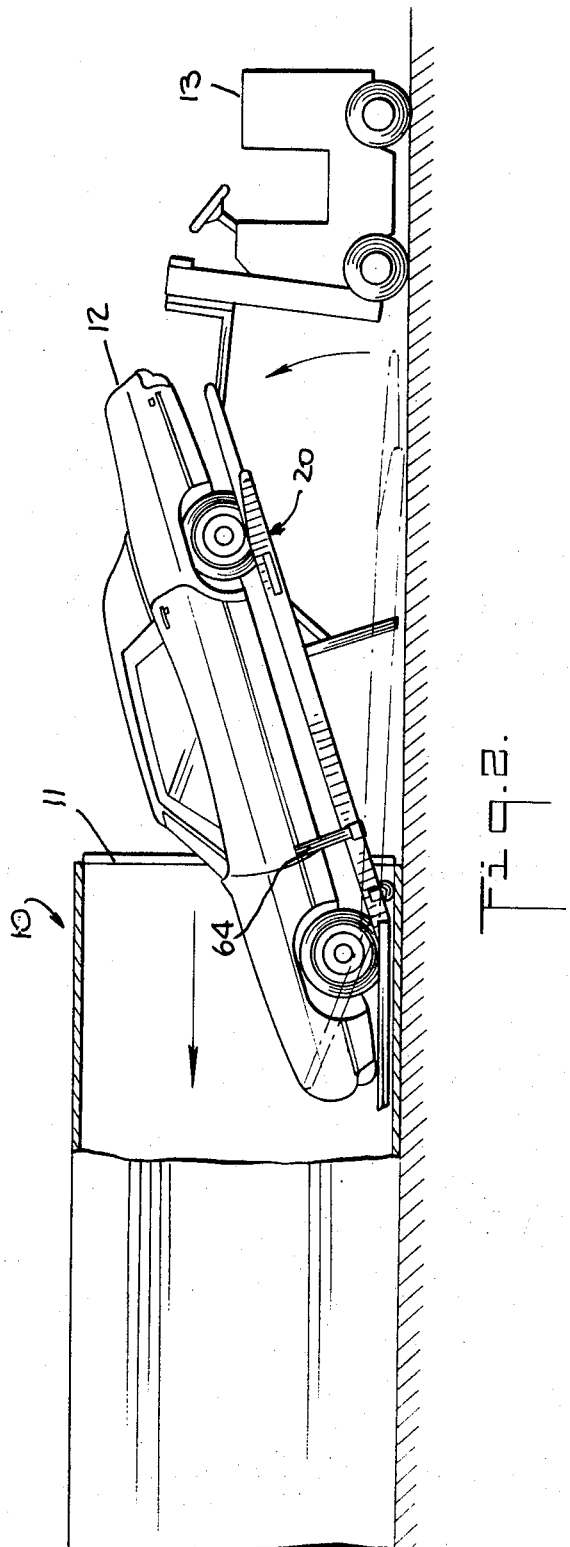

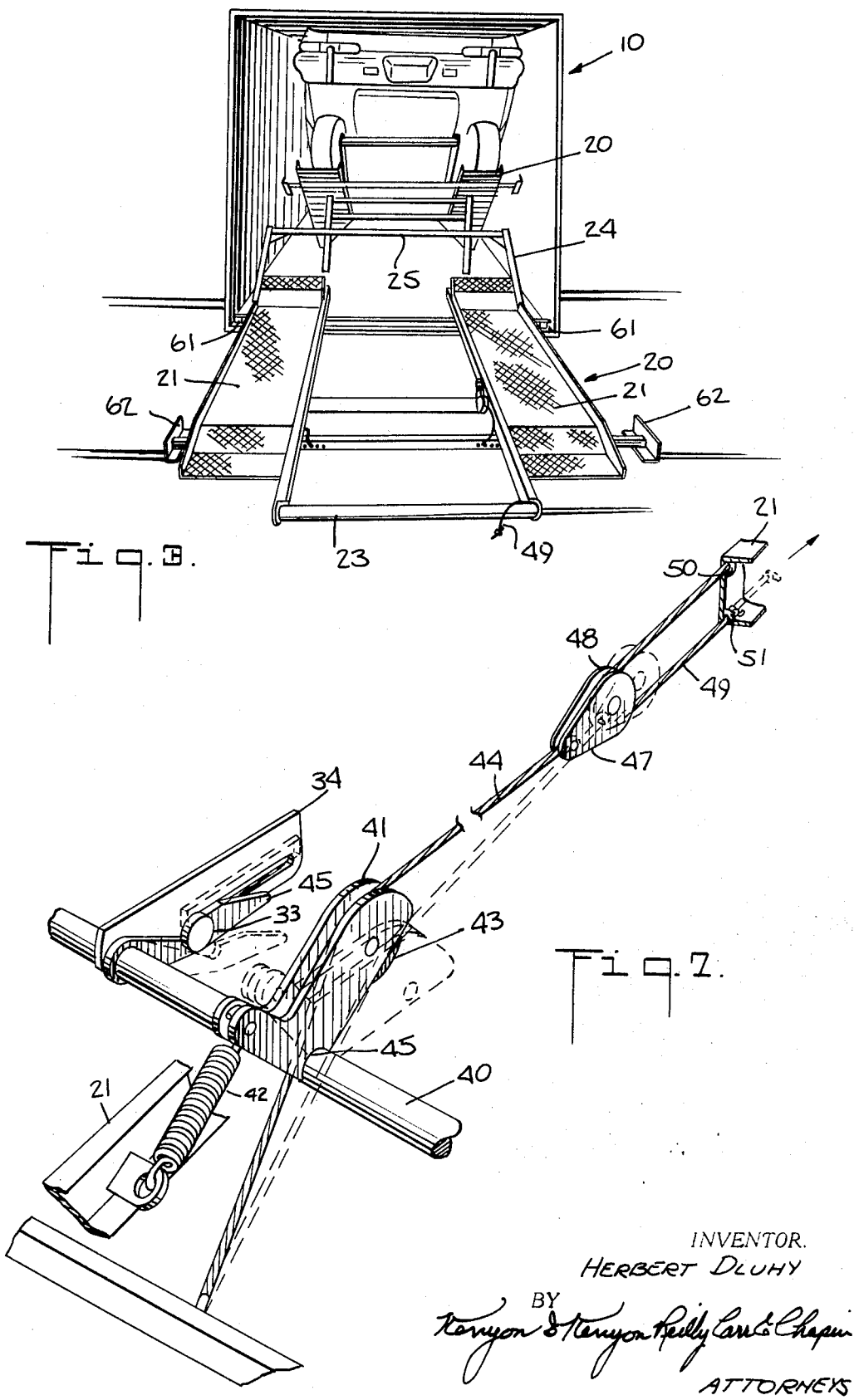

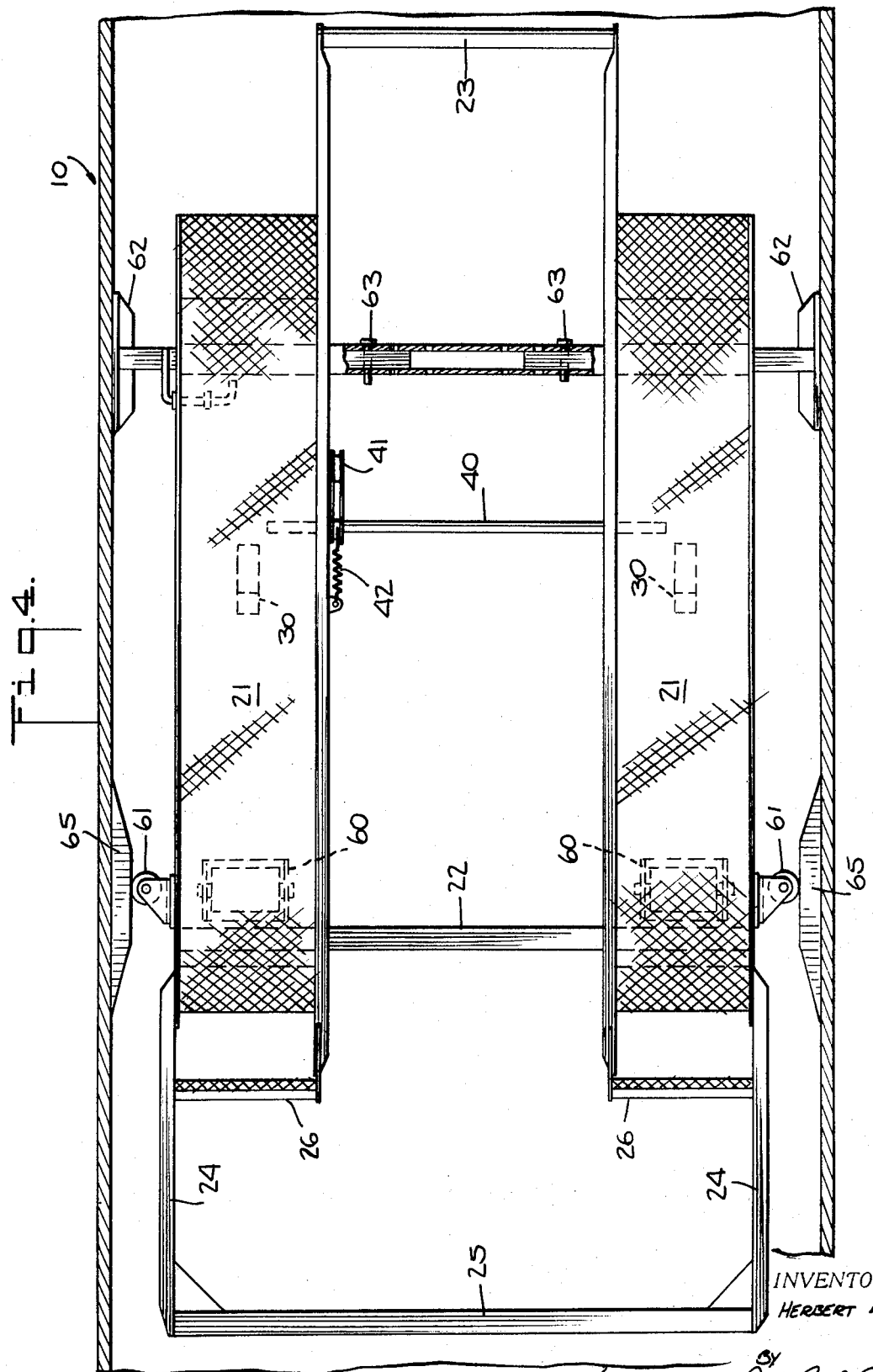

INVENTOR.
HERBERT DLUHY

SHIPPING CONTAINER WITH RACKS FOR SUPPORTING VEHICLES THEREIN

BACKGROUND OF THE INVENTION

This invention relates in general to a means for stowing vehicles, and more particularly to one wherein a vehicle support rack allows for stowage of a vehicle in an inclined position.

It is heretofore been known to position vehicles, such as automobiles, in an inclined position during shipment in order to allow a greater number of vehicles to be transported within a confined space. Such types of apparatus have been in frequent use on trailer trucks and the like, and have been generally successful in permitting a great number of vehicles to be carried by a single truck. It has also been suggested to place vehicles in various stacked and inclined positions for shipment in railroad freight cars. Although the prior art devices have met with some degree of success in that they provide a compact shipping arrangement, there remain a number of deficiencies, particularly in the manner in which the vehicles are loaded onto the support member. This has frequently necessitated substantial set-up time in arranging drive-on ramps adjacent the support member prior to the placement of the vehicles thereon. Further, in some instances such as in the loading of freight cars, specialized lifts were required.

In the shipping industry, it is still common practice to place the vehicles to be transported within a closable container without the utilization of any support rack. This has often resulted in a non-compact type of shipment and a waste of valuable space. For instance, in a standard 40 feet × 8 feet × 8 feet or 40 feet × 8 feet × 8 feet 6 inches container, it is common practice to fit only two standard size automobiles therein, since the length of such automobile precludes any greater number to be placed there. By the means disclosed herein, and which is particularly suitable for use with such shipping containers, three cars can readily be shipped in a space previously allotted to only two cars. Further, the method of loading and stowing the vehicle disclosed herein has been found to substantially decrease the handling time and also alleviate or practically eliminate many of the inconveniences associated therewith.

SUMMARY OF THE INVENTION

Briefly stated, the invention disclosed herein provides a vehicle support rack which is preferably utilized in combination with a shipping container to allow for the compact placement of a plurality of vehicles therein. The support rack includes a pair of substantially parallel spaced apart channel-like tracks which are connected to one another. The tracks are held in an inclined position by means of support legs disposed at one end thereof. A stop is further provided to preclude any substantial movement of the vehicle along the tracks when they are placed in the inclined position. The support legs are of a collapsible type and automatically locked when in the supporting position. The locking means includes a pivotally mounted catch member biased into engagement with the support legs in order to hold the latter in a locked position. Further, the locking means is characterized in that it is released upon the application of a force.

Further embodiments of the invention include a locking means for securing the support legs in the horizontal or inactive position. Additionally, roller members are provided on the bottom and sides of the rack in order to facilitate easy maneuvering, particularly with respect to the container into which the rack and vehicle are preferably placed.

In operation, the rack is positioned with the tracks in a substantially horizontal position so that the vehicle may be driven or otherwise placed thereon. Once the vehicle is in position on the rack, one end thereof is raised into an inclined position, with the support legs being locked in order to maintain the rack and vehicle in that position. The rack is then placed within the container and restrained to preclude any substantial relative movement therebetween. In one of the embodiments, a plurality of racks may be positioned within an elongated container so that a substantial increase in the amount of vehicles carried by that container results.

Accordingly, it is an object of this invention to provide a means for compactly stowing vehicles.

It is another object of this invention to provide a vehicle support rack which may be raised into an inclined position and which contains thereon means to facilitate easy maneuvering.

It is still another object of this invention to provide a method of stowing vehicles within a shipping container, which method is adapted to be performed in rapid sequence by means conventionally available.

These other objects, advantages and features of the invention will become more apparent from the following description taken in conjunction with the accompanying drawings.

BRIEF DESCRIPTION OF THE DRAWINGS

FIG. 1 is a side elevation view, partly in cross-section, of a plurality of support racks, each having a vehicle stowed thereon, positioned within a shipping container;

FIG. 2 is a side elevation view, partly in cross-section of the rack of this invention being positioned within a shipping container;

FIG. 3 is a perspective view looking into a shipping container having a support rack partially positioned therein;

FIG. 4 is a plan view, partly in cross-section, of the support rack positioned within a shipping container;

FIG. 7 is a fragmentary perspective view of the mechanism for locking the leg in the support position and the associated tie ropes.

DESCRIPTION OF THE PREFERRED EMBODIMENT

Figure 5:
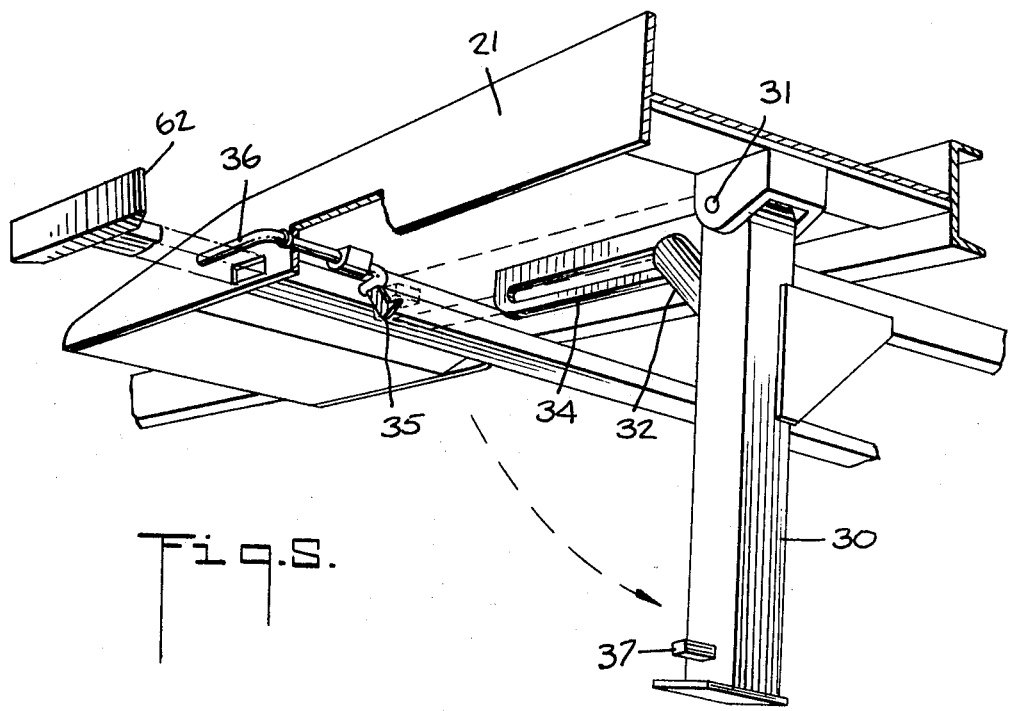
FIG. 5 is a fragmentary perspective view of the support rack and the mechanism for locking the support legs in the inactive position.

Referring to the drawings, particularly FIG. 1, the rack assembly 20 is illustrated as being used in conjunction with a shipping container 10, although in certain instances the rack assembly may be used by either itself or with other devices. The container 10 is of a type which has an opening in at least one end, such as at 11. The vehicles 12 are preferably driven onto the rack assembly 20 while it is in a substantially horizontal position, such as illustrated in FIG. 3. Subsequently, rack assembly 20 is lifted at the rearward portion by conventionally available means such as the fork lift truck 13 illustrated. The rack 20 contains along its lower edge a plurality of rollers, to be more fully described hereinafter, which allow it to be readily moved into container through the end opening 11 while held in the inclined position by the fork lift truck 13. As an alternative, the rack assembly 20 may be pushed into the container 10 while in the lower position and raised into the support position while inside the container. The container 10, as illustrated, is a standard type measuring 40 feet × 8 feet × 8 feet or 40 feet × 8 feet × 8 feet 6 inches and as commonly used today without any support fixtures or racks allows for containerization of only two vehicles. As illustrated in FIG. 1, utilization of the rack assembly 20 of this invention permits three vehicles to be housed within the same container.

The details of the rack construction will now be described with primary reference to FIGS. 4 – 7. The rack assembly 20 includes a pair of spaced apart channel-like tracks 21 onto which the vehicle 12 may be driven. The upper surface of each of the racks 21 is preferably cleated for improving the frictional resistance between the track and tires of the vehicle to be supported. A cross member 22 is provided near the forward end of the tracks 21 for joining each of the tracks to one another. Similarly, at the rearward portion, another cross member 23 is joined to the interior track extensions to complete the support rack frame. At the forward portion and extending from the outer edges of each of the tracks 21 is an upwardly inclined brace 24. Each of the braces 24 are coupled to one another by means of the forward connecting member 25 which also acts as a rack positioning member such as when the rack assembly is brought into abutting relation with an adjacent assembly. Disposed slightly in front of each of the tracks 21 is a stop 26 which, when the vehicle 12 is placed in the inclined position, engages the forward wheels of the vehicle to preclude any movement when the rack assembly 20 is in the inclined position.

A support leg 30 is pivotally coupled to the bottom side of each of the tracks 21, and is located slightly in from the rearward or loading end of rack assembly 20. Each leg 30 is pivotally mounted at point 31 and has attached thereto a brace member 32. Brace member 32 contains a pin 33 at its upper end and which is engaged with the slotted member 34 affixed to the lower portion of each track 21. The locking mechanism of FIG. 5 is adapted to hold the support legs 30 in a horizontal or inactive position. A leg catch 35 is welded to the rod 36, with the former being engagable with the protruding pin 37 on the lower portion of support leg 30. In this manner, leg 30 is held in the inactive position by means of the catch 35. Once the rack assembly 20 has been raised to the inclined position, the legs 30 may be released and moved downwardly as shown in FIG. 5 by a clockwise rotation of the rod 36.

Figure 6:
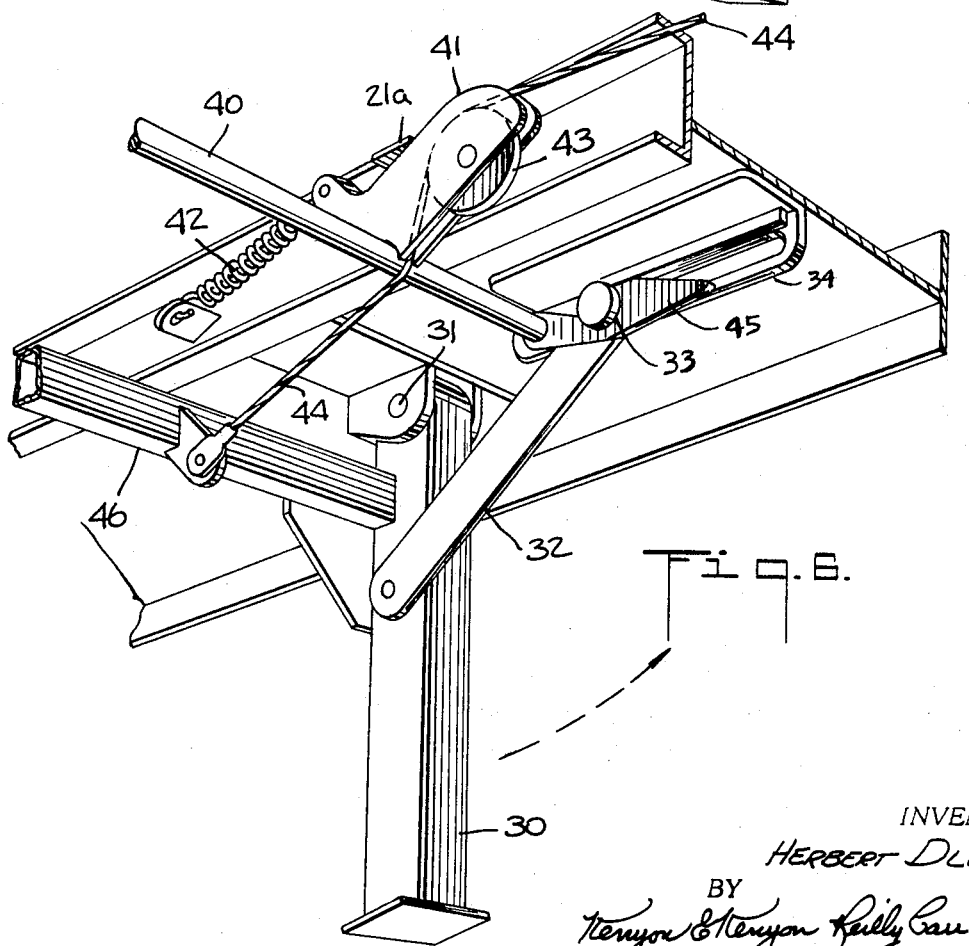
FIG. 6 is a fragmentary perspective view of the support rack and the mechanism for locking the legs in the support position.

With particular reference to FIGS. 6 and 7, the mechanism for locking the legs 30 in the support or erect position is illustrated. A cross bar 40 is rotatably mounted at each end in the holes provided in slotted members 34. Attached to cross bar 40 is lever 41 which is coupled at one end to spring 42. Spring 42 is fastened at the other end to track 21 thereby exerting a counterclockwise rotational force on cross bar 40. The rotation of cross bar 40 is restricted by stop 21a which engages lever 41 when the latter rotates clockwise. Lever 41 contains on the other end thereof a sheave 43 which has rope 44 disposed thereover. Adjacent the ends of cross bar 40 are mounted catch members 45 which engage pin 33 to lock support legs 30 in place.

Locking of the legs 30 is accomplished automatically in the following manner. Once the rack assembly 20 is raised, such as by the fork lift truck 13, rotation of lever 36 releases the support legs 30 from the inactive position and allows their downward movement due to gravity. Pin 33 thereby moves forward in the slotted member 34. As pin 33 engages the sloped portion of catch 45, the latter is caused to pivot downwardly against the force of spring 42 until pin 33 engages the notched portion of the catch at the end of its travel. Because of the force exerted by spring 42, catch 45 then moves upwardly and automatically locks legs 30 in the support position because of its engagement with pin 33.

Rope 44 is fixed at one end on the support leg cross member 46, then directed under cross bar 40 and over sheave 43. The rope 44 extends toward the rearward portion of the rack assembly 20 and is there fixed to a block 47 (FIG. 7). Block 47 includes another pulley 48 which has rope 49 directed thereover. Rope 49 is affixed at 50 to the track channel 21 and at its other end passes through guide 51.

Releasing support legs 30 from the locked position is accomplished by pulling at the end of rope 49 while the rack assembly 20 is raised from the ground so that the legs are free to rotate. Pulling rope 49 causes lever 41 to rotate clockwise to the position indicated by the dotted lines in FIG. 7. This also rotates catch 45 in a clockwise direction and disengages the pin 33 from the catch. During a continued pulling at the end of line 49, sheave 43 acts only as a guide as legs 30 are rotated toward the inactive position. Simultaneously, pins 33 are moved rearward due to the connection of braces 32. In this manner, while one operator is pulling line 49, the fork lift operator lowers the rack assembly 20 and the legs are forced automatically into the inactive position.

The rack assembly 20 is provided with rollers 60 on the lower side to enable the entire assembly to be easily maneuvered into a container or other suitable area (FIG. 4). Additionally, a castor roller 61 is provided on each side of the rack assembly 20 and is intended to engage the side walls of the container 10 as the rack assembly is being positioned therein. A lateral support member 62 is provided at the rearward portion of the rack assembly 20 on each side thereof. The lateral supports 62 are moved into engagement with the inner surface of the container 10 in the manner illustrated in FIG. 4. Once in this position, locking pins 63 are inserted through each side of the supports 62 in order to hold them in their locked position.

IN the initial operation, the rack assembly 20 is positioned with the tracks 21 placed horizontally on the ground. Preferably, the forward portion of the rack assembly 20 is positioned within the container 10 an amount sufficient so that the side rollers 61 are within the container. The vehicle 12 is then appropriately placed on the rack assembly 20 and prepared for shipment by disconnecting the battery, draining the gastank and the like. The vehicle may then be fastened to the assembly frame by means of straps 64 illustrated in FIG. 1. Items such as disconnecting the battery or other preparatory steps may be accomplished with easy access to the vehicle, unlike the present practice which allows such steps to be accomplished only after the vehicle is in the container. Further, the driver of the vehicle may readily leave the vehicle prior to placement within the container thus avoiding the present difficulties associated with climbing through the vehicle's window while inside the container.

A lifting device such as the fork lift truck 13 illustrated in FIG. 2, is next brought into engagement with the rear cross member 23 and lifted upwardly to raise the rack assembly 20 into the inclined position illustrated. By a clockwise turning of the support leg release rod 36, each of the support legs 30 are lowered into the erect or support position. Locking of the support legs in this position is accomplished automatically by means of the springloaded catches previously described. The rack assembly 20 is next moved forwardly into the container 10 and guided by the side castor rollers 61 until it is longitudinally positioned with the rollers 61 engaging the chocks 65 mounted within the container. As an alternative, the rack with the automobile mounted thereon may be pushed into the container in a substantially horizontal position and raised to its full height or support position shortly before reaching the end of travel. The rack assembly 20 may be secured to preclude lateral movement by extending the lateral supports 62 into engagement with the inner walls of the shipping container 10. The next rack assembly is similarly moved into the shipping container 10 until the forward member 25 engages the support legs 30 of the immediately preceding rack assembly. The last rack assembly 20 is further secured within the container by placing a block 65 behind the support legs 30. Once each of the vehicles has been properly loaded into position, the container door is closed and ready for shipment. The unloading procedure is substantially the reverse of the loading procedure and may be accomplished with the same type of conventionally available equipment.

It is readily apparent that utilization of the rack assembly of this invention permits a greater number of vehicles to be housed within a container than allowed by prior practices. Further, the rack is adapted for easy maneuvering and allows for simple, efficient and rapid loading of vehicles and their subsequent placement within a container by substantially conventionally available equipment.

Although the above description is directed to a preferred embodiment of the invention, it is noted that other variations and modifications will be apparent to those skilled in the art and, therefore, may be made without departing from the spirit and scope of the present disclosure.

What is claimed is:

1. The combination with a fully closable elongated shipping container having an openable panel and at least one support rack within the same and which rack is adapted to support a vehicle thereon, said support rack comprising a pair of substantially parallel spaced apart tracks for supporting the vehicle, means connecting each track of said pair of tracks to one another, support means pivotally mounted adjacent one end of said pair of tracks adapted to hold said tracks in an inclined position, stop means for precluding any substantial movement of said vehicle along said tracks when the latter are in said inclined position, a releasable catch member for engaging and securing said support means in the inactive position, a pivotally mounted catch member for locking said support means in the support position, means resiliently biasing said pivotally mounted catch member into locking engagement with said support means, and means disposed adjacent the other end of said pair of tracks for pulling said pivotally mounted catch member out of engagement with said support means in order to release the latter from the support position when said other end of said support rack is raised.

2. The combination as set forth in claim 1 wherein said support means comprises a pair of spaced apart support legs and means interconnecting said support legs to one another, and said pivotally mounted catch member is mounted to said interconnecting means to hold said support legs in the locked position.

3. The combination as set forth in claim 2 which further comprises a pivotable lever member mounted to said interconnecting means for supporting said releasable catch member, and handle means to facilitate rotating said lever member so as to cause said releasable catch member to be unlocked from said support means.

4. The combination as set forth in claim 2 wherein each of said pair of tracks includes a slotted member disposed on the lower side thereof, said each of said support legs has attached thereto a pivotally mounted brace member, said pivotally mounted brace member having the other end thereof slidably engaged with said slotted member.

5. The combination as set forth in claim 1 wherein said rack further includes mounted on the lower surface thereof a roller member to facilitate maneuvering of said rack into said container and wherein said openable panel of said shipping container is one of the smaller end panels thereof.

6. The combination as set forth in claim 5 wherein said rack further includes mounted along each side thereof a castor roller member to facilitate maneuvering of the rack with respect to said container.

7. The combination with a fully closable elongated shipping container having an openable end panel and at least one support rack within the same and which rack is adapted to support a vehicle thereon, said support rack comprising a pair of substantially parallel spaced apart tracks for supporting the vehicle, means connecting each track of said pair of tracks to one another, support means pivotally mounted adjacent one end of said pair of tracks adapted to hold said tracks in an inclined position, stop means for precluding any substantial movement of said vehicle along said tracks when the latter are in said inclined position, and means for locking said support means to hold said tracks in said inclined position, said locking means being pivotally mounted so as to be brought into engagement with said support means in order to hold said support means in the locked position, a slotted member disposed on the lower side of each of said pair of tracks and a pivotally mounted brace member attached to each of said support legs, said pivotally mounted brace member having the other end thereof slidably engaged with said slotted member.

* * * * *